United States Patent
Baker et al.

(10) Patent No.: US 9,533,892 B2
(45) Date of Patent: Jan. 3, 2017

(54) FLAME SPRAY SYNTHESIS OF MONOCLINIC LU2O3 NANOPARTICLES

(71) Applicants: Colin C. Baker, Alexandria, VA (US); Woohong Kim, Lorton, VA (US); Guillermo R. Villalobos, Springfield, VA (US); Jasbinder S. Sanghera, Ashburn, VA (US); Ishwar D. Aggarwal, Charlotte, NC (US)

(72) Inventors: Colin C. Baker, Alexandria, VA (US); Woohong Kim, Lorton, VA (US); Guillermo R. Villalobos, Springfield, VA (US); Jasbinder S. Sanghera, Ashburn, VA (US); Ishwar D. Aggarwal, Charlotte, NC (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 14/797,398

(22) Filed: Jul. 13, 2015

(65) Prior Publication Data
US 2015/0315034 A1 Nov. 5, 2015

Related U.S. Application Data

(62) Division of application No. 13/585,884, filed on Aug. 15, 2012.

(Continued)

(51) Int. Cl.
*C01F 17/00* (2006.01)
*C01B 13/32* (2006.01)
(Continued)

(52) U.S. Cl.
CPC ............ *C01F 17/0043* (2013.01); *B82Y 30/00* (2013.01); *C01G 1/02* (2013.01); *C04B 35/50* (2013.01); *C04B 35/62665* (2013.01); *C04B 35/6455* (2013.01); *C09K 11/7767* (2013.01); *C09K 11/7769* (2013.01); *C09K 11/7784* (2013.01); *B82Y 40/00* (2013.01); *C01P 2002/54* (2013.01); *C01P 2002/72* (2013.01);
(Continued)

(58) Field of Classification Search
CPC ...... C01F 17/0043; B01J 10/002; B01J 23/10; C01B 13/326; C01B 13/34; F02G 2258/10; F02G 2258/90
USPC ..................... 423/21.1, 263, 592.1
See application file for complete search history.

(56) References Cited

U.S. PATENT DOCUMENTS

2013/0059153 A1* 3/2013 Baker ................. C01F 17/0043
428/402

OTHER PUBLICATIONS

Zhang et al., Lu2O3:Eu3+ nanoparticles and processed ceramics: Structural and spectroscopic studies, J. Mater. Res., vol. 19, No. 9, 2004.*

(Continued)

*Primary Examiner* — Holly Le
(74) *Attorney, Agent, or Firm* — US Naval Research Laboratory; Joseph T. Grunkemeyer

(57) ABSTRACT

A nanoparticle containing monoclinic lutetium oxide. A method of: dispersing a lutetium salt solution in a stream of oxygen gas to form droplets, and combusting the droplets to form nanoparticles containing lutetium oxide. The combustion occurs at a temperature sufficient to form monoclinic lutetium oxide in the nanoparticles. An article containing lutetium oxide and having an average grain size of at most 10 microns.

14 Claims, 5 Drawing Sheets

(a)

(b)

Related U.S. Application Data

(60) Provisional application No. 61/530,473, filed on Sep. 2, 2011.

(51) Int. Cl.

| | | |
|---|---|---|
| *C01B 13/34* | (2006.01) | |
| *C09K 11/77* | (2006.01) | |
| *C01G 1/02* | (2006.01) | |
| *B82Y 30/00* | (2011.01) | |
| *C04B 35/50* | (2006.01) | |
| *C04B 35/626* | (2006.01) | |
| *C04B 35/645* | (2006.01) | |
| *B82Y 40/00* | (2011.01) | |

(52) U.S. Cl.
CPC ...... *C01P 2004/03* (2013.01); *C01P 2004/52* (2013.01); *C04B 2235/3203* (2013.01); *C04B 2235/443* (2013.01); *C04B 2235/445* (2013.01); *C04B 2235/5445* (2013.01); *C04B 2235/5454* (2013.01); *C04B 2235/72* (2013.01); *C04B 2235/762* (2013.01); *C04B 2235/786* (2013.01); *F02G 2258/10* (2013.01); *F02G 2258/90* (2013.01); *Y10T 428/2982* (2015.01)

(56) References Cited

OTHER PUBLICATIONS

Martinet et al., Optical, structural and fluorescence properties of nanocrystalline cubic or monoclinic Eu:Lu2O3 films prepared by pulsed laser deposition, J. of Luminescent 126 (2007) 807-816.*

Kammler et al., Flame Synthesis of Nanoparticles, Chem. Eng. Technol. 24 (2001) 6.*

* cited by examiner (a)

(b)

(a)

(b)

(a)

(b)

FLAME SPRAY SYNTHESIS OF MONOCLINIC LU2O3 NANOPARTICLES

This application is a divisional application of pending U.S. application Ser. No. 13/585,884, filed on Aug. 15, 2012, which claims the benefit of U.S. Provisional Application No. 61/530,473, filed on Sep. 2, 2011. The provisional application and all other publications and patent documents referred to throughout this nonprovisional application are incorporated herein by reference.

TECHNICAL FIELD

The present disclosure is generally related to nanoparticles and articles comprising lutetium oxide and method of making thereof.

DESCRIPTION OF RELATED ART $Yb^{3+}$ doped $Lu_2O_3$ is a useful solid state laser material because it has a high conductivity, high melting point, and excellent efficiencies. Lutetium oxide has a high thermal conductivity that is insensitive to the amount of rare earth ion dopant, and it has low phonon scattering (Sanghera et al., *Optics Letters* 36, 576-8 (2011)). Since $Lu_2O_3$ and $Yb_2O_3$ have the same cubic crystal structures and very close ionic radii, they easily form a solid solution. Undoped $Lu_2O_3$ powders are available but they have large particle sizes and agglomeration. Attempts to fabricate transparent ceramics with these high impurity level and agglomerated powders have been unsuccessful. Therefore, it is desirable to obtain nano-sized, high purity powders with narrow size distributions and low agglomeration to provide high optical transparency in ceramics.

Some of the previous methods for the synthesis of $Lu_2O_3$ have included Co-precipitation (Chen et al., "A novel Co-Precipitation Synthesis of a New Phosphor $Lu_2O_3:Eu^{3+}$" *J. Eur. Ceram. Soc.* 27, 191-197 (2007); Hosokawa et al., U.S. Pat. No. 7,597,866), oxalate precipitation (Lempicki et al., "A New Lutetia-Based Ceramic Scintillator for X-ray Imaging" *Nucl. Instr. Meth. Phys. Res. Sec. A* 488[3], 579-590 (2002)) and molten salts routes (Trojan-Piegza et al., "Preparation of Nanocrystalline $Lu_2O_3$:Eu Phosphor Via a Molten Salts Route" *J. Alloys Comp.* 380[1-2], 118-122 (2004)). These processes however are more complicated and time consuming than the FSP synthesis route.

Larger grained materials, due to their relatively low mechanical strength compared with smaller grained ceramics, are less desirable in applications demanding high thermal shock resistance, such as high-energy laser systems that can generate significant heat loads. Larger grain also leads to larger defects and results in scattering sites in the ceramic. Scattering is caused by complicated microstructures that consist of grains, grain boundaries, pores, and phase impurities. Therefore it is desirable to reduce the grain size to obtain a high transparency ceramic. Another loss mechanism in solid state laser is due to absorption caused by the impurities including transition metals and other ionic species present in the ceramic. Scattering in the transparent ceramics, in some cases, can be minimized by optimizing the processing conditions including powder size distribution control, sintering pressure and temperature.

Flame spray pyrolysis (FSP) techniques are gas phase processes that are very effective in producing high purity oxide nanoparticles such as $TiO_2$ and $SiO_2$ on an industrial scale (Pratsinis, *Prog. Energy Combust. Sci.* 17, 197-219 (1998); Madler et al., *J. Aerosol Sci.* 17, 369-89 (2002)). In these processes precursor materials which are either volatile, or are aerosolized by various means, undergo combustion to form product powders. In the liquid feed flame spray pyrolysis (LF-FSP) procedure (Hinklin et al., *Chem. Mater.* 20, 553-8 (2008); Laine et al., *Key Eng. Mat.* 159, 17-24 (1999)) high enthalpy liquid precursors are fed into a nozzle and sprayed into an oxy-methane flame. Once in the flame the droplets evaporate and undergo combustion in the flame volume which serves as the reaction zone for the process. Aerosol species formed are rapidly quenched as they leave the reaction zone, leading to the formation of nanoparticles.

BRIEF SUMMARY

Disclosed herein is a nanoparticle comprising monoclinic lutetium oxide.

Also disclosed herein is a method comprising: dispersing a lutetium salt solution in a stream of oxygen gas to form droplets, and combusting the droplets to form nanoparticles comprising lutetium oxide. The combustion occurs at a temperature sufficient to form monoclinic lutetium oxide in the nanoparticles.

Also disclosed herein is an article comprising lutetium oxide having an average grain size of at most 10 microns.

BRIEF DESCRIPTION OF THE DRAWINGS

A more complete appreciation of the invention will be readily obtained by reference to the following Description of the Example Embodiments and the accompanying drawings.

DETAILED DESCRIPTION OF EXAMPLE EMBODIMENTS

Figure 1:
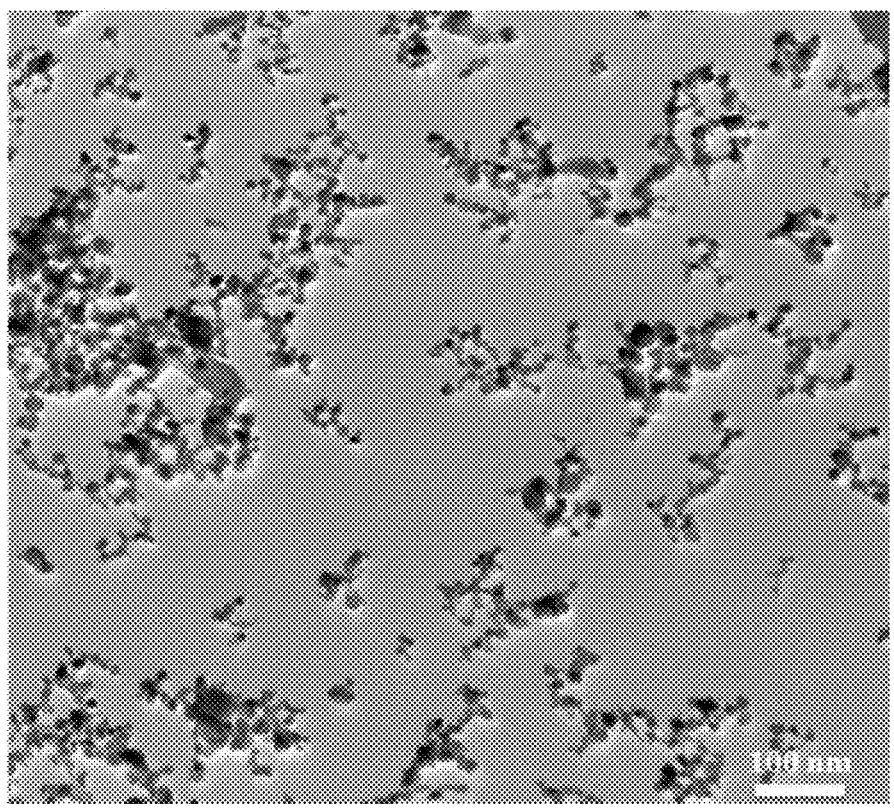
FIG. 1 shows (a) a TEM image of $Yb^{3+}$ doped $Lu_2O_3$ nanoparticles and (b) corresponding particle size distribution.
Figure 1:
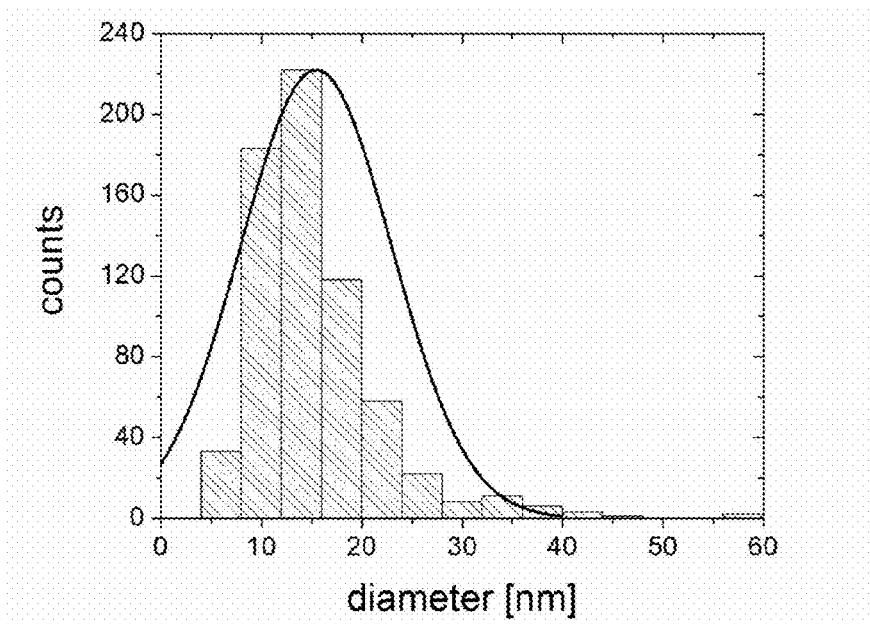

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Disclosed herein is a process to obtain $Lu_2O_3$ nanosized powders optionally doped with ytterbium ($Yb^{3+}$) or other rare earths. This method can include steps of purifying nitrate precursors and synthesis of the precursors into final product nanopowders using an FSP technique. This technique is used to provide a convenient synthesis route to produce uniform nano-sized, doped powders with control of the material phase to cubic or monoclinic states. Uniform nanosized particles are important for various optical applications that require hot pressing or sintering, including ceramic lasers. The monoclinic $Lu_2O_3$ phase is a high free energy metastable phase as compared to the cubic equilibrium phase, which allows the use of lower temperatures and pressures for densification into useful optical ceramics. To this end nanoparticles with both cubic and monoclinic phases can be created by changes in the process conditions.

Nano-sized, high purity powders with narrow size distribution and low variations in agglomeration can provide high optical transparency in ceramics. Optical quality transparent ceramics may be prepared via hot pressing of the $Lu_2O_3$ nanoparticles formed using the FSP technique. The FSP system can be used to control the material phase of the nanoparticles by changing the $O_2$ dispersion gas flow rate. Different $O_2$ dispersion gas flow rates, among other parameters, may affect the particle residence time in the flame resulting in the formation of different nanoparticulate phases. A metastable phase of $Lu_2O_3$, which has never been reported using the FSP technique, may be made. Significantly, the presence of the metastable phase enables the ceramic powders to be hot pressed at lower temperatures resulting in smaller grain sizes, resulting in excellent optical quality $Lu_2O_3$ windows.

Densification of ceramic powders is generally accomplished through atomic diffusion, which is activated by thermal energy in the case of pressureless sintering, and by thermal and shear energy in the case of hot pressing. Since hot pressing uses shear energy in addition to thermal energy, ceramics can be densified at lower temperatures which results in a finer grain structure and consequently yields a stronger material. If other energy sources can be added to the system, the temperature could be further reduced thereby improving the material properties. Therefore, this is an advantage to obtaining a metastable phase in the flame spray synthesis process. The monoclinic lutetia phase is a high free energy metastable phase as compared to the cubic equilibrium phase. This allows the use of lower temperatures and pressures for densification because the high free energy of the monoclinic phase is added to the total energy of the system. The ceramic was able to be densified at nearly 200° C. lower temperatures. Additionally, the conversion of the monoclinic phase to the stable cubic phase, by definition, requires the atoms to rearrange into the more orderly stable phase.

The disclosed method provides a way to obtain nanoparticles for ceramic optical applications. The nanoparticles produced are suitable for solid state laser materials and other optical applications. This technique may also lead to new ceramic materials due to the ability to produce a new phase.

The nanoparticles may be made by first providing a lutetium salt solution, such as a lutetium nitrate solution. Suitable solvents include, but are not limited to, ethanol and any other solvent that dissolves the salt and is combustible. Polar organic solvents such as alcohols may meet these requirements. The solution may also comprise a rare earth salt, such as a nitrate, to create doped nanoparticles. The rare earths include scandium, yttrium, lanthanum, cerium, praseodymium, neodymium, promethium, samarium, europium, gadolinium, terbium, dysprosium, holmium, erbium, thulium, ytterbium, and lutetium, though the use of lutetium would not produce a doped material. Nitrates of all the rare earths, typically hydrates thereof, are either commercially available or may be made by methods well known in the art.

The solution is dispersed in a stream of oxygen to from droplets of the solution. This may be performed using an FSP apparatus or any other apparatus that produces an aerosol of droplets of the solution. The droplets are then combusted to form nanoparticles comprising lutetium oxide and optionally the rare earth dopant. The combustion may also be performed by the FSP apparatus where the solution and oxygen are sprayed from a central nozzle, such as a capillary, and surrounding flames ignite the droplets. The nanoparticles may then be collected by any method of collecting the product of an FSP method.

The combustion is performed at a temperature sufficient to form monoclinic lutetium oxide in the nanoparticles. A higher temperature causes more rapid reaction so that the metastable form is produced and quenched. A number of factors may be adjusted to produce the monoclinic form. Increasing the oxygen flow from the central nozzle or capillary to at least 3 L/min or at least 5 L/m produces a hotter flame. Increasing the flow of the fuel to the surrounding flames also increases the temperature. Increasing the flow of the solution has the opposite effect. X-ray diffraction may be used to determine whether any set of parameters produced the monoclinic form by comparison to the XRD results shown below.

The resulting nanoparticles comprise monoclinic lutetium oxide, optionally cubic lutetium oxide, and optionally the rare earth dopant. At least some of the nanoparticles may have, but are not limited to, a maximum diameter as determined from a TEM image of at most 1 micron, 100 nm, 50 nm, 20 nm, or 10 nm. The average diameter of all the nanoparticles produced may be, but is not limited to, at most 20 nm or 15 nm.

The collected particles may be densified by any method to form a monolithic mass such that at least a portion of the nanoparticles are bound together to form a solid article rather than the nanoparticle powder. The densification may be by pressing and sintering the nanoparticles after optionally mixing the nanoparticles with a sintering agent. The sintering may be performed at a reduced temperature, such as 1400-1700° C., due to the presence of the monoclinic form. The sintering may convert some or all of the monoclinic form to cubic form. The densified or sintered body may have an average grain size of at most 10 microns.

The following examples are given to illustrate specific applications. These specific are not intended to limit the scope of the disclosure in this application.

Example 1

Synthesis of the $Yb^{3+}$ doped $Lu_2O_3$

Solutions were prepared by dissolving 100 grams of 1-10% $Yb(NO_3)_3.xH_2O$ and $Lu(NO_3)_3.xH_2O$ powder precursors in 500 mL DI water. The nitrate solutions were then purified by crystallization and subsequent washes followed by filtration by passing through 0.8 μm filter media. Finally batches of 20 g of $Yb^{3+}$Lu-nitrate were dissolved in 100 mL of ethanol to give the final precursor solution.

Example 2

Flame Spray Pyrolysis

The liquid precursor was fed through a custom built flame spray apparatus two-phase nozzle at flow rates that varied from 3-10 mL/min with the aid of an $O_2$ dispersion gas/oxidant that had a flow rate that was varied from 2-7 L/min. All gases were supplied via mass flow controllers. Small pilot flames ignited from flowing 1.5 L/min $CH_4$ and 3 L/min $O_2$ forming a ring pattern were used as the flame ignition source and as a supporting flame for the larger central flame. The pilot flame ringlet surrounded a central capillary tube that sprayed the precursor solution mixed with an oxygen dispersion gas to form precursor droplets that underwent combustion in the large central flame. The powders were collected on Whatman GF 6 glass fiber filter paper mounted in a custom built water cooled stainless steel collection chimney. Both the precursor flow rate and oxygen dispersion gas flow rate were varied in order to control the material phase.

Example 3

TEM of Nanoparticles

The samples were sonicated in acetone and placed drop wise on a transmission electron microscope (TEM) grid before imaging. The particle size was characterized using a JEOL JEM 2200FS transmission electron microscope working at 200 kV. The particle size distribution was obtained by using digital image analysis of TEM images using NIS Elements BR 3.2 software by Nikon. Particle surface area and equivalent diameter were characterized with BET using a Micromeritics ASAP 2010 system.

FIG. 1(a) shows a TEM image of $Yb^{3+}$ doped $Lu_2O_3$ nanoparticles, with the corresponding particle size distribution given in FIG. 1(b). The mean particle diameter was found to be 15 nm. The sample was synthesized with an oxygen dispersion gas flow rate of 2 L/min and a precursor flow rate of 10 mL/min. It can be seen that the sample consists of primary particle size ranges from 20-50 nm and a low degree of agglomeration. The BET surface area of the particles was found to be 28.9 $m^2/g$ with an equivalent diameter of 22 nm.

Example 4

Varying Oxygen Dispersion Gas Flow Rate

Figure 2:
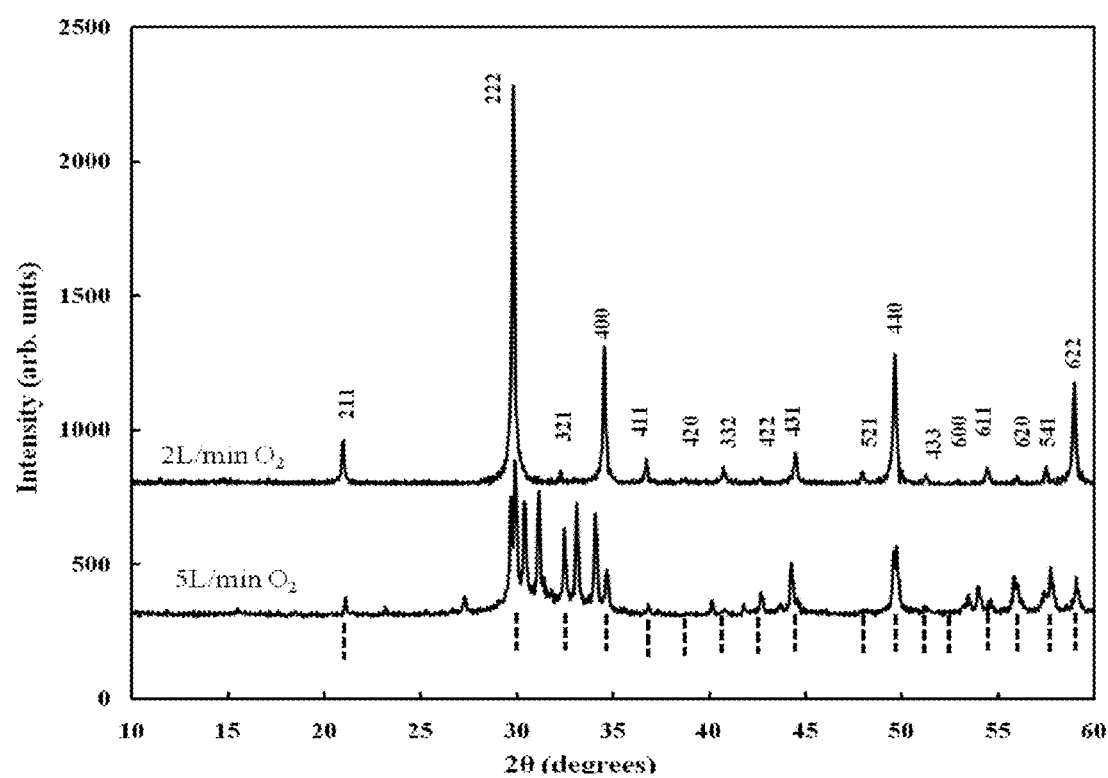
FIG. 2 shows XRD patterns for varying oxygen dispersion gas flow rates. Cubic $Lu_2O_3$ peaks are indicated with a dashed line and are indexed.

This examples details nanoparticle material phase changes as a result of oxygen dispersion gas flow rate. The particles were characterized with X-ray diffraction (XRD) in a Scintag XDS 2000 diffractometer using Cu Kα radiation. In FIG. 2 an XRD pattern is given for the case where the dispersion gas flow rate was decreased from 5 L/min to 2 L/min. It can be seen that through these changes in oxygen dispersion gas flow rate the material phase of the $Lu_2O_3$ was controlled. The sample that was synthesized at 2 L/min was identified as being pure cubic $Lu_2O_3$, space group Ia3 as identified by PDF#12-0728. This cubic phase is indicated in the figure with dashed lines and is indexed. For the sample synthesized at 5 L/min there is also an extra material phase indicated by the XRD pattern, which may be a metastable monoclinic phase (Williams et al., "Preparation and Fluorescence Spectroscopy of Bulk Monoclinic $Eu^{3+}:Y_2O_3$ and Comparison to $Eu^{3+}:Y_2O_3$ Nanocrystals" *J. Phys. Chem., B* 102[6], 916-920 (1998)).

It was observed that decreases in $O_2$ dispersion gas flow rate served to increase the length of the flame from a short intense flame of approximately 25 mm to a longer flame of approximately 150 mm. A similar increase in flame length with a reduction in oxygen flow rate for flame spray synthesized materials has been observed by other groups (Madler et al., "Flame Made Ceria Nanoparticles" *J. Mater. Res.* 17[6], 1356-1362 (2001)). For a low oxygen flow-rate the fuel is consumed at a slower rate, thus decreasing combustion (Kammler et al., "Flame Synthesis of Nanoparticles" *Chem. Eng. Technol.*, 24[6], 583-596 (2001)). An oxygen deficient, longer flame may also serve to dilute and enhance mixing of the $Lu_2O_3$ during growth (Madler et al., "Flame Made Ceria Nanoparticles" *J. Mater. Res.* 17[6], 1356-1362 (2002)), the effect of which is to produce nanoparticles in their equilibrium state. Conversely, shorter, more intense flames give rapid quenching of the nanoparticles trapping the particles in a metastable state, thus producing the monoclinic phase. Although a transition to a monoclinic phase has been reported for $Lu_2O_3$ (Madler et al., "Controlled Synthesis of Nanostructured Particles by Flame Spray Pyrolysis" *J. Aerosol Sci.* 33[2], 369-389 (2002)), this transition only occurred at extremely high temperatures and pressures. This transition is not known to be previously reported for flame spray pyrolysis synthesized $Lu_2O_3$.

Example 5

Densification

Figure 3:
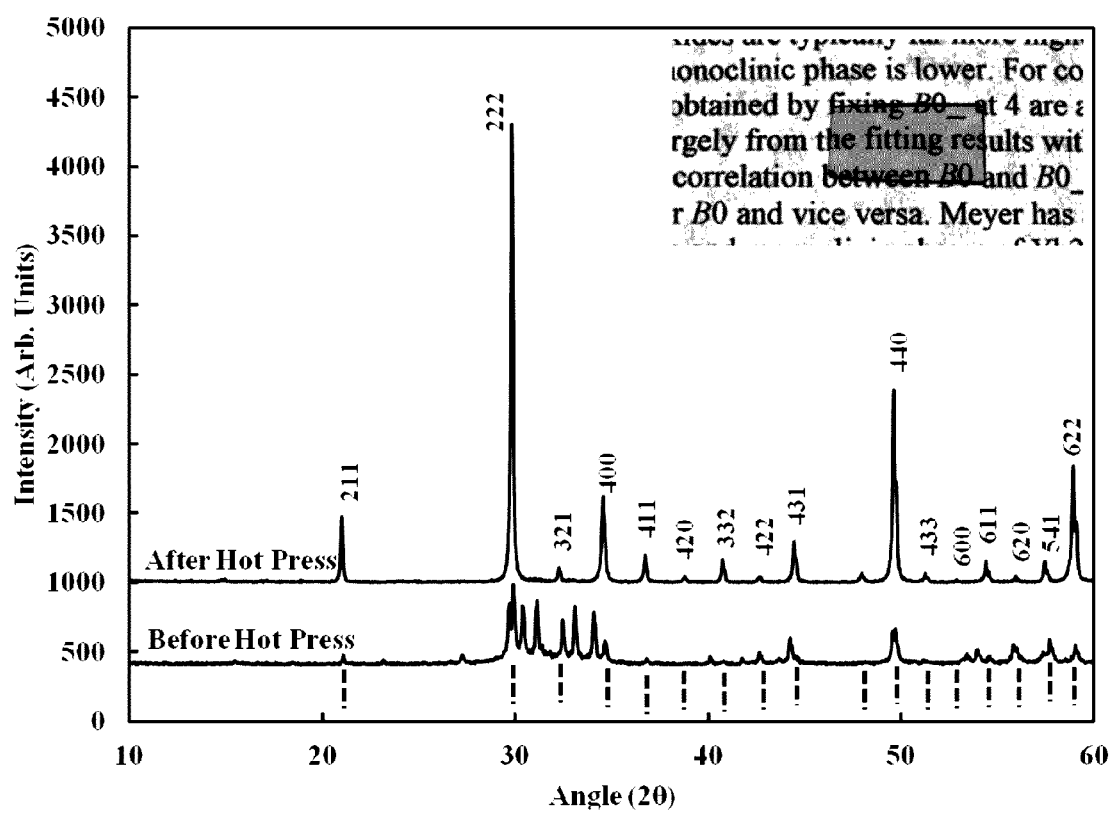
FIG. 3 shows XRD patterns for $Yb^{3+}Lu_2O_3$ samples before and after hot press. The insert shows the corresponding transparent sample after hot pressing.

The densification process consisted of mechanically mixing the powders with a LiF sintering agent, hot pressing in a temperature range of 1400° C.~1700° C. at a pressure of ~8 kpsi, hot isostatic pressing at 30 kpsi, and finally optical polishing to transparency. This example has shown that in order to obtain a pure cubic phase, the precursor flow rate should be maximized while the oxygen dispersion gas flow rate should be minimized. FIG. 3 shows the XRD pattern of the ceramic obtained by hot pressing the powder containing a mixture of cubic and meta-stable monoclinic phase. It is seen that the meta-stable phase has disappeared completely and the sample only contains the cubic phase. The insert shows the corresponding transparent ceramic.

Example 6

Grain Size

Figure 4:
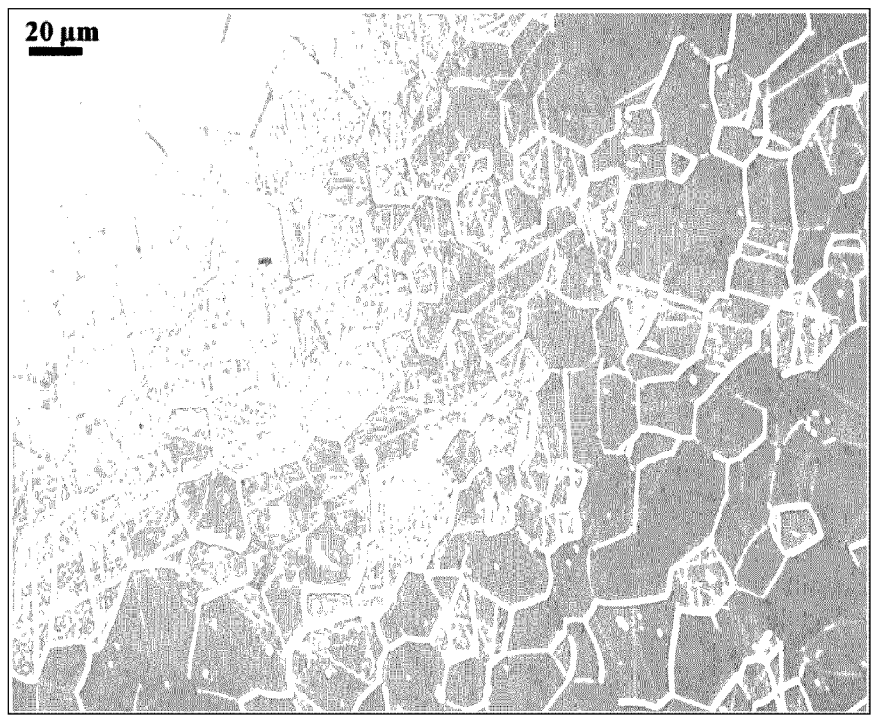
FIG. 4 shows optical microscope images of (a) cubic phase sample hot pressed at 1625° C. and (b) mixed phase hot pressed at 1450° C.
Figure 4:
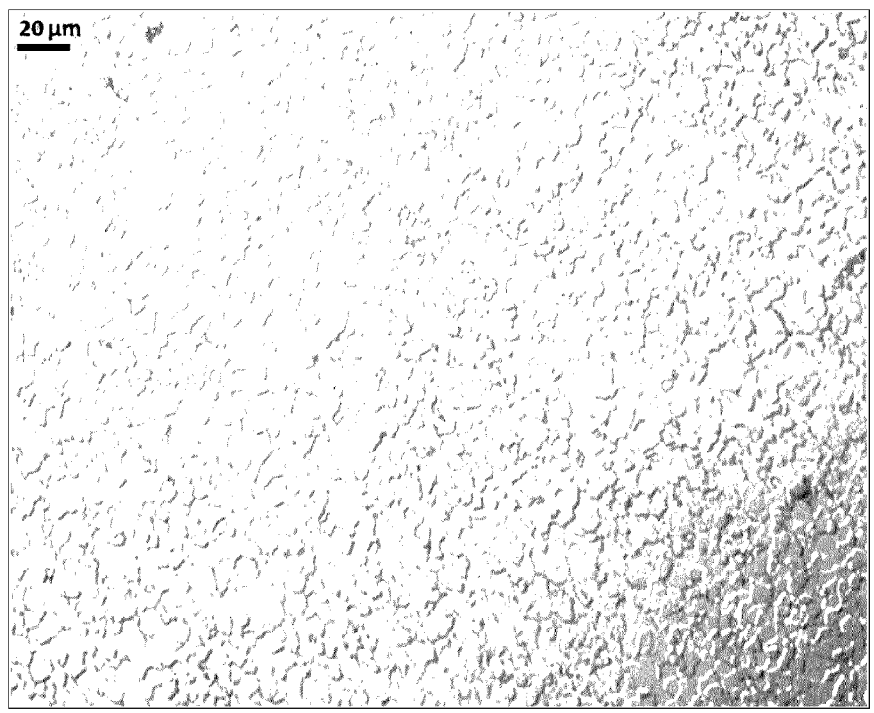
Figure 5:
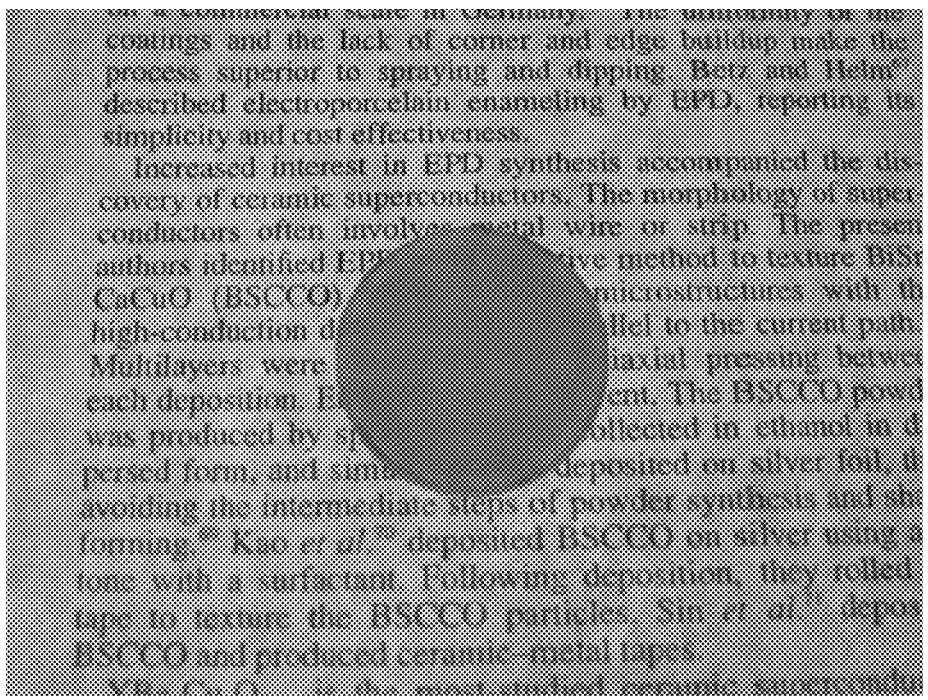
FIG. 5 shows photographs of $Yb^{3+}Lu_2O_3$ samples of (a) cubic phase sample hot pressed at 1625° C. and (b) mixed phase hot pressed at 1450° C.
Figure 5:
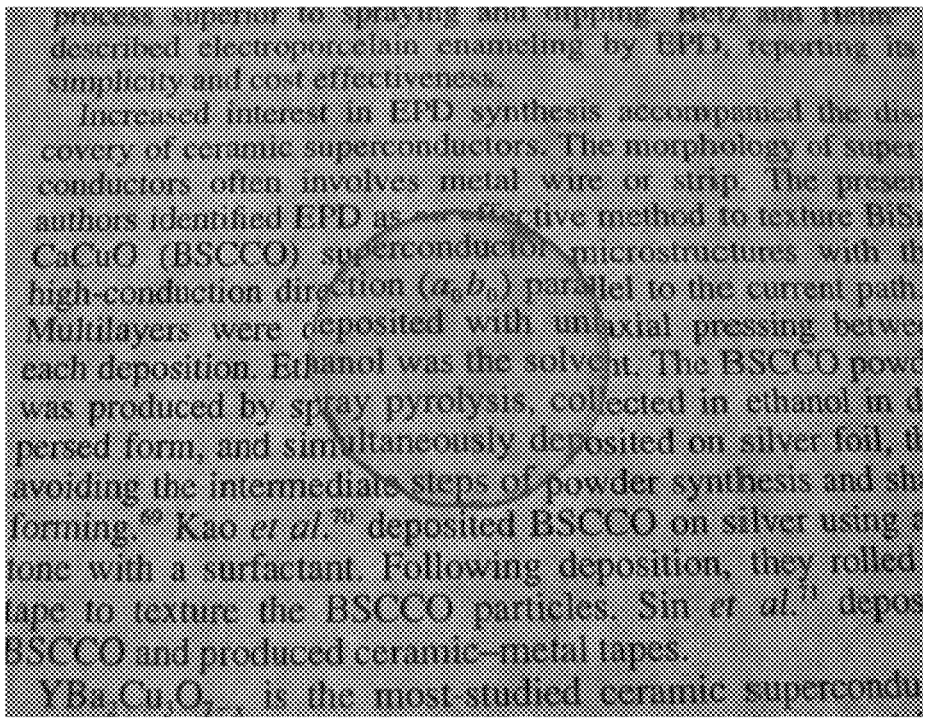

This example details the grain size of the hot pressed ceramic by comparing samples from the pure cubic phase to those with the mixed metastable phase. In FIG. 4 the grain size for a pure cubic phase sample that was hot pressed at 1625° C. is compared to one with a mixed monoclinic phase pressed at 1450° C. The density of both samples was measured to be very close to the theoretical density of $Lu_2O_3$. It can be seen that the grains with the mixed phase have been greatly reduced from about 20-40 μm to less than 10 μm. Smaller grain sizes are advantageous because it is generally accepted that the strength of ceramic materials are empirically correlated to their grain size, where the strength of the ceramic body should be inversely proportional to the final grain size. FIG. 5 shows photographs of $Yb^{3+}Lu_2O_3$ samples of (a) cubic phase sample hot pressed at 1625° C., which is opaque and (b) mixed phase hot pressed at 1450° C., which is transparent.

Obviously, many modifications and variations are possible in light of the above teachings. It is therefore to be understood that the claimed subject matter may be practiced otherwise than as specifically described. Any reference to claim elements in the singular, e.g., using the articles "a," "an," "the," or "said" is not construed as limiting the element to the singular.

What is claimed is:
1. A method comprising:
   dispersing a lutetium salt solution in a stream of oxygen gas and a fuel to form droplets; and
   combusting the droplets to form nanoparticles comprising lutetium oxide;

wherein the combustion occurs at a temperature sufficient to form monoclinic lutetium oxide in the nanoparticles.

2. The method of claim 1, wherein the stream of oxygen gas flows at a rate of at least 3 L/min.

3. The method of claim 1, wherein the solution further comprises a rare earth salt.

4. The method of claim 3, wherein the rare earth salt is a ytterbium salt, a holmium salt, or a europium salt.

5. The method of claim 1, further comprising:
collecting the nanoparticles.

6. The method of claim 5, further comprising:
densifying the nanoparticles to form a monolithic mass.

7. The method of claim 6, wherein the densifying is performed by:
mixing the nanoparticles with a sintering agent; and
pressing and sintering the nanoparticles.

8. A method comprising:
dispersing a lutetium salt solution in a stream of oxygen gas and a fuel to form droplets; and
combusting the droplets to form nanoparticles comprising lutetium oxide;
wherein the combustion occurs at flow rates of the oxygen, the fuel, and the solution sufficient to form monoclinic lutetium oxide in the nanoparticles.

9. The method of claim 8, wherein the stream of oxygen gas flows at a rate of at least 3 L/min.

10. The method of claim 8, wherein the solution further comprises a rare earth salt.

11. The method of claim 10, wherein the rare earth salt is a ytterbium salt, a holmium salt, or a europium salt.

12. The method of claim 8, further comprising:
collecting the nanoparticles.

13. The method of claim 12, further comprising:
densifying the nanoparticles to form a monolithic mass.

14. The method of claim 13, wherein the densifying is performed by:
mixing the nanoparticles with a sintering agent; and
pressing and sintering the nanoparticles.

* * * * *